United States Patent
Sharma et al.

(10) Patent No.: US 11,960,448 B2
(45) Date of Patent: *Apr. 16, 2024

(54) UNIFIED OBJECT FORMAT FOR RETAINING COMPRESSION AND PERFORMING ADDITIONAL COMPRESSION FOR REDUCED STORAGE CONSUMPTION IN AN OBJECT STORE

(71) Applicant: NetApp Inc., San Jose, CA (US)

(72) Inventors: Palak Sharma, Haryana (IN); Dibyasri Nandi, Kolkata (IN); Sindhushree K N, Karnataka (IN); Cheryl Marie Thompson, Sunnyvale, CA (US); Qinghua Zheng, San Jose, CA (US); Venkateswarlu Tella, Bangalore (IN); Debanjan Paul, West Bengal (IN); Dinakaran Narayanan, Chennai (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,858

(22) Filed: Apr. 28, 2022

(65) Prior Publication Data

US 2023/0133433 A1 May 4, 2023

(30) Foreign Application Priority Data

Oct. 28, 2021 (IN) .............................. 202141049373

(51) Int. Cl.
*G06F 16/17* (2019.01)
*G06F 3/06* (2006.01)
(Continued)

(52) U.S. Cl.
CPC ........ *G06F 16/1744* (2019.01); *G06F 3/0604* (2013.01); *G06F 3/0611* (2013.01);
(Continued)

(58) Field of Classification Search
CPC .............. G06F 16/1744; G06F 3/0604; G06F 3/0611; G06F 3/0619; G06F 3/064;
(Continued)

(56) References Cited

U.S. PATENT DOCUMENTS

| 5,652,857 | A | * | 7/1997 | Shimoi | ................. | G06F 3/0601 |
|---|---|---|---|---|---|---|
| | | | | | | 711/E12.019 |
| 8,745,338 | B1 | * | 6/2014 | Yadav | .................... | G06F 3/067 |
| | | | | | | 707/693 |

(Continued)

OTHER PUBLICATIONS

Non-Final Office Action dated Jun. 23, 2023 for U.S. Appl. No. 17/731,881, filed Apr. 28, 2022, 15 pages.
Non-Final Office Action mailed on Nov. 28, 2023 for U.S. Appl. No. 17/731,900, filed Apr. 28, 2022, 29 pages.
Final Office Action mailed Dec. 19, 2023 for U.S. Appl. No. 17/731,881, filed Apr. 28, 2022, 14 pages.

*Primary Examiner* — Hicham Skhoun
(74) *Attorney, Agent, or Firm* — Cooper Legal Group, LLC

(57) ABSTRACT

Techniques are provided for implementing a unified object format. The unified object format is used to format data in a performance tier (e.g., infrequently accessed data, snapshot data, etc.) into objects that are stored into an object store for low cost, scalable, long term storage compared to storage of the performance tier. With the unified object format, compression of the data may be retained when the data is stored as the objects into the object store. Additional compression may also be provided for the data in the objects. The unified object format includes slot header metadata used to track the location of the data within the object notwithstanding the data being compressed and/or stored at non-fixed boundaries. The slot header metadata may be cached at the performance tier for improved read performance and may be repaired by a repair subsystem (a slot header repair subsystem).

20 Claims, 11 Drawing Sheets

(51) Int. Cl.
  *G06F 11/07* (2006.01)
  *G06F 11/14* (2006.01)
  *G06F 11/20* (2006.01)
  *G06F 16/11* (2019.01)
  *G06F 16/174* (2019.01)
  *G06F 11/10* (2006.01)

(52) U.S. Cl.
  CPC ............ *G06F 3/0619* (2013.01); *G06F 3/064* (2013.01); *G06F 3/0653* (2013.01); *G06F 3/067* (2013.01); *G06F 11/0712* (2013.01); *G06F 11/0718* (2013.01); *G06F 11/0727* (2013.01); *G06F 11/1453* (2013.01); *G06F 11/1464* (2013.01); *G06F 11/2094* (2013.01); *G06F 16/116* (2019.01); *G06F 11/1004* (2013.01); *G06F 2201/84* (2013.01)

(58) Field of Classification Search
  CPC ...... G06F 3/0653; G06F 3/067; G06F 3/0679; G06F 11/1464; G06F 16/116; G06F 2201/84; G06F 11/2094; G06F 3/0608; G06F 3/061; G06F 3/065; G06F 3/0685; G06F 11/1453
  USPC ......................................................... 707/649
  See application file for complete search history.

(56) References Cited

U.S. PATENT DOCUMENTS

| | | | |
|---|---|---|---|
| 9,959,280 B1* | 5/2018 | Whitehead | G06F 16/13 |
| 2010/0281004 A1 | 11/2010 | Kapoor et al. | |
| 2014/0279960 A1 | 9/2014 | Marwah et al. | |
| 2017/0031940 A1* | 2/2017 | Subramanian | G06F 16/13 |
| 2017/0177603 A1 | 6/2017 | Constantinescu et al. | |
| 2017/0242864 A1 | 8/2017 | Wolfram et al. | |
| 2018/0217897 A1 | 8/2018 | Nazari et al. | |
| 2018/0246664 A1 | 8/2018 | Wu et al. | |
| 2018/0373596 A1 | 12/2018 | Bhowmik et al. | |
| 2019/0324844 A1 | 10/2019 | Subramanian et al. | |
| 2020/0201842 A1 | 6/2020 | Patel et al. | |
| 2020/0285410 A1* | 9/2020 | George | G06F 3/0665 |
| 2020/0285612 A1* | 9/2020 | George | G06F 16/128 |
| 2020/0285614 A1* | 9/2020 | George | G06F 11/1451 |
| 2021/0124645 A1 | 4/2021 | Chinthekindi et al. | |
| 2021/0294499 A1 | 9/2021 | Wang et al. | |
| 2022/0027354 A1 | 1/2022 | Florendo et al. | |
| 2022/0371498 A1 | 11/2022 | Sato et al. | |
| 2023/0135151 A1 | 5/2023 | Sharma et al. | |
| 2023/0135954 A1 | 5/2023 | Sharma et al. | |

* cited by examiner

UNIFIED OBJECT FORMAT FOR RETAINING COMPRESSION AND PERFORMING ADDITIONAL COMPRESSION FOR REDUCED STORAGE CONSUMPTION IN AN OBJECT STORE

RELATED APPLICATIONS

This application claims priority to India Patent Application, titled "UNIFIED OBJECT FORMAT FOR A CLOUD BACKUP SYSTEM AND A HYBRID STORAGE SYSTEM", filed on Oct. 28, 2021 and accorded Indian Application No.: 202141049373, which is incorporated herein by reference.

BACKGROUND

A device such as a node may store data on behalf of a client within a volume. The volume may be stored within local storage accessible to the device, such as within on-premise storage. The device may implement storage management functions for the client. For example, the device may create backups of the volume by creating snapshots of the volume. A snapshot of the volume may capture a point-in-time representation of a state of the volume. The device may use the snapshot in order to restore the volume back to a state of the volume at which the snapshot was created. A cloud backup system may be configured to back up the snapshots to an object store for low cost long term retention. A hybrid storage system may utilize storage of the device as a performance tier for actively processing client I/O and the object store an external capacity tier for storing infrequently accessed data.

DETAILED DESCRIPTION

Figure 1:
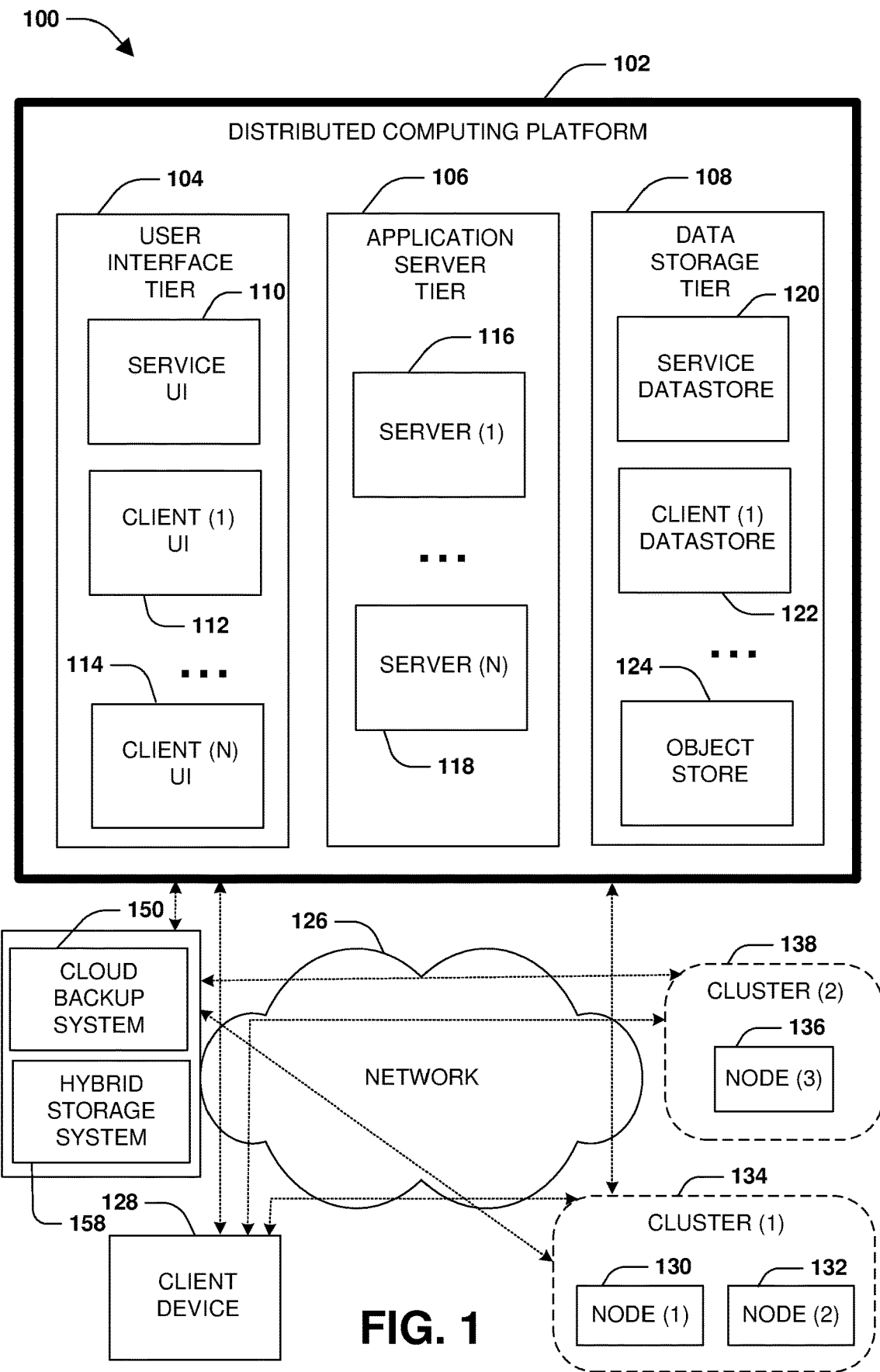
FIG. 1 is a block diagram illustrating an example computing environment in which an embodiment of the present technology may be implemented.

The techniques described herein are directed to implementing a unified object format that is compatible with both a cloud backup system and a hybrid storage system. The present technology provides a cost effective system for storing and retrieving data. Frequently accessed client data is stored within a performance tier that provides low latency access to the client data. In this way, client I/O operations are executed upon the performance tier for reduced latency and improved client performance for access the client data. Infrequently accessed client data is tiered out from the performance tier to an object store for long term, scalable, low cost storage. In order to reduce the cost and storage consumed by the infrequently accessed client data, the unified object format is used to preserve any compression that was performed upon the client data while in the performance tier. The unified object format is also used to perform additional compression for the client data. Such compression greatly reduces the amount of storage used to store this client data within the object store, which provides substantial cost savings to the client than if uncompressed client data was stored in the object store.

The present technology also improve the latency and cost of accessing client data in the object store. In order to read data stored within an object of the object store, an offset and length of where the data is stored within the object must be known. Thus, two read operations must be performed to the object store in order to read the data. One read operation to read the offset and length from the slot header metadata and an additional read operation to read the actual data according to the offset and length. This greatly increases the latency of reading the data and increases the cost of reading the data (e.g., the object store may charge on a per operation basis). In order to reduce this read latency and cost, the slot header metadata is cached at the performance tier within a persistent metafile that can be quickly and locally accessed to obtain the offset and length, which is then used to issue a single read operation to read the data from the object according to the offset and length.

The present technology also provides a repair subsystem (a slot header repair subsystem) that can recover from failures, data corruption, data loss, and stale data. The repair subsystem may be implemented for the performance tier. If the persistent metafile experiences data corruption, data loss, or becomes stale, then the repair subsystem executes a repair procedure to repair or replace the persistent metafile so that the client does not experience the increased read latency and/or cost that would otherwise be incurred without the benefit of the persistent metafile.

A storage environment may be implemented as a hybrid cloud environment. With the hybrid cloud environment, data may be stored across various types of storage hosted by various storage providers, computing devices, services, and/or nodes. For example, the hybrid cloud environment may include on-premise storage that is implemented as a performance tier of the hybrid cloud environment. The on-premise storage may be comprised of primary storage managed by a node (e.g., data storage device 210(1) accessible to disk module 216(1) of node 202(1)), such as disks attached to the node, network attached storage, locally attached storage, memory of the node, etc. The hybrid cloud environment may also comprise storage hosted by a $3^{rd}$ party cloud storage provider (e.g., storage provided by cloud storage nodes 236). The storage of the $3^{rd}$ party cloud storage provider (e.g., AWS, Azure, a $3^{rd}$ party hyperscaler, a multi-tenant computing environment, etc.) may be implemented as an object store within which clients may store data in objects. It may be appreciated that a variety of other types of storage (e.g., HDDs, SSD, NVMe storage, etc.) and/or storage provided by other services, nodes, and/or computing devices (e.g., a locally implemented object store implemented on-premise by a node) may be used as storage of the hybrid cloud environment.

The cloud backup system may create snapshots of volumes (e.g., volumes of data stored within the on-premise storage) and backup up the snapshots into the hybrid cloud environment, such as into the object store as objects. The hybrid storage system may store client data within the various types of storage of the hybrid cloud environment, such as by storing frequently accessed data within the on-premise storage (e.g., storing frequently accessed data within the faster on-premise storage for fast client access) and infrequency accessed data in the storage of the $3^{rd}$ party cloud storage provider such as in the object store (e.g., store infrequently accessed data within the slower object store for reduced storage costs). The hybrid storage system may tier that data between the various types of storage of the hybrid storage system.

Within conventional storage environments that do not have a unified object format, a node may store data in a volume that is hosted within storage such as on-premise storage. The cloud backup system may be capable of creating snapshots of the volume and backing up these snapshots into objects within an object store (e.g., a cloud storage environment). A snapshot, whose data is backed up into the objects, may be used to restore the volume to a prior state captured by the snapshot. These objects may be formatted according to an object format that may be proprietary to the cloud backup system. Thus, other systems such as a hybrid storage system may be unable to interpret this object format and thus is unable to provide functionality for the objects. Similarly, the hybrid storage system may provide data tiering functionality that stores frequently accessed data within a performance tier (e.g., the on-premise storage) and infrequently accessed data within a capacity tier of the object store according to a format that is proprietary to the hybrid storage system. Thus, other systems such as the cloud backup system are unable to provide functionality for the data managed by the hybrid storage system.

In addition to the hybrid storage system and the cloud backup system being unable to interpret, access, and/or provide functionality for the same objects due to using different object formats, compression may not be retained when the hybrid storage system tiers data from the performance tier to the capacity tier. In particular, the hybrid storage system may implement a temperature sensitive storage efficiency feature that may compress data in the performance tier according to various compression algorithms as the data becomes colder. In particular, as data is accessed less frequently (becomes colder), larger/heavier compression algorithms may be used to compress the cold data such as by using 32kb compression. This compressed data may reside in the performance tier, such as an on-premise tier, and results in storage savings.

Object store storage may be relatively cheaper than storage of the performance tier, and thus the data may be tiered to the object store in order to reduce cost. Unfortunately, the compression that was performed upon the data while in the performance tier may not be maintained when tiering the data to the object store, and thus any storage savings from compression at the performance tier is lost when the data is tiered to the object store. This is because the current object format of objects used by the hybrid storage system to tier data to the object store may need the data to be stored at fixed offsets within the object, otherwise the data cannot be located. When data is compressed into a compression group, there is no longer a fixed offset for the data because the data is being compressed with other data (e.g., eight 4kb blocks may be compressed together using 32kb compression). Thus, when tiering the data to the object store, the data must be decompressed, packed into objects according to the object format propriety at the hybrid storage system, and stored to the object store in an uncompressed state. Thus, all storage savings from compression are lost when the data is tiered to the object store.

In order to address these deficiencies, the present technology implements a unified object format that is compatible with both the cloud backup system and the hybrid storage system. This unified object format is used to format objects comprising data tiered out to the object store. With this unified object format, an object comprises slot header information that may be self-contained within the object. The slot header information comprises information per slot within the object and has compression group information about how data is grouped within the object. This information may be used to locate particular blocks of data within objects even if the data has been compressed through compression groups. This information may also be used to selectively retrieve or tier out certain data on-demand from the performance tier to the capacity tier. This allows the hybrid storage system to retrieve select data (e.g., frequently accessed) on-demand from the object store, and allows the cloud backup system to merely tier out remaining data not yet tiered out to the object store by the hybrid storage system.

Because the unified object format may be compatible with both the cloud backup system and the hybrid storage system, a whole volume copy to cloud backup to an object store may be provided by the cloud backup system for a volume (e.g., a volume comprising user data) managed by the hybrid storage system. The whole volume copy to cloud backup may be performed by merely tiering what blocks of the volume have not already been tiered by the hybrid storage system to the object store. For example, if the hybrid storage system has tiered 80% of the data in the volume (e.g., relatively infrequently accessed user data) to the object store, then the cloud backup system has to merely transfer the remaining 20% of data in the volume (e.g., mainly metadata) in order to perform and complete the whole volume copy to cloud backup of the volume. That is, when data of a volume is partially tiered to the object store by the hybrid storage system, a backup to the object store of the complete volume by the cloud backup system may be incrementally performed (e.g., backing up merely the 20%) as merely the remaining data of the volume needs to be backed up to the object store and the data already stored in the object store in objects can be skipped. This is enabled because of the common unified object format that both systems can interpret and utilize.

The unified object format layout may be used to format objects comprising data being tiered to the object store, such as compressed data. The unified object format layout may be leveraged by both the hybrid storage system and the cloud backup system, along with other products and features, to format objects according to the same unified object format. This enables interplay between the hybrid storage system and the cloud backup system. For example, the hybrid storage system may tier infrequently accessed data to the object store in objects formatted according to the unified object format, while leaving some frequently accessed data and metadata in the performance tier. Subsequently, if all of the data is to be archived to the object store, then the cloud backup system merely copies the remaining data from the performance tier to the object store into objects formatted according to the unified object format. Without this unified object format layout, all of the data would have to be retrieved from the object store by the cloud backup system, reformatted into the object format proprietary to the cloud backup system, and then stored back into the object store. In another example, the cloud backup system may be used to archive a volume to the object store so that all data of the volume is located in the object store in objects formatted according to the unified object format. Subsequently, the hybrid storage system may be used to selectively bring back certain data (e.g., frequently accessed data and metadata) from the object store to the performance tier on-demand so that the data may be readily accessible to clients.

Because the unified object format layout enables the ability to locate particular blocks of data that have been compressed into compression groups and stored within objects, compression provided by the performance tier may be retained, along with the ability to perform additional compression.

This unified object format layout provides the ability to maintain a file system independent/agnostic format so that data managed by the file system may be interpreted by tools/analytics that run on in the object store. The unified object format layout provides seamless data mobility across different engines/modules, such as a logical replication engine, analytical tools, backup functionality, etc. The unified object format layout may be a self-contained format, which is used to preserve compression savings from the file system at the performance tier and provides flexibility to perform additional compression when tiering data out to the object store. Performing compression while tiering data to the object store improves storage savings at the capacity tier of the object store. This compression during tiering can be performed regarding of whether the data was compressed or not compressed by the file system at the performance tier. This self-contained unified object format enables the ability to decompress and recompress to a bigger compression chunk size such as by using a different (heavier) compression algorithm. The unified object format layout may be optimized to have a smaller metadata footprint for representing compression information. With this unified object format layout, slot header information is self-contained within an object. The slot header information comprises information per slot and has compression group information about how data is grouped in the group. This information is used to locate a compression group comprising a particular block of data. In this way, the slot header information can be used to translate from a slot number to an actual location in an object of a corresponding compression group containing a particular block. Accordingly, the compression group (e.g., a 32kb compression group) can be read from the object, decompressed, and the block can be accessed.

In some embodiments, the unified object format reduces the amount of metadata that must be cached within the performance tier to 4kb (e.g., an 8× reduction) for data tiered to the object store and improves the read performance on a primary workload. In particular, the proprietary object format used by the cloud backup system may be suitable for backup environments for backing up data to a capacity tier but may not be suitable for use by a file system for primary workloads (e.g., processing read and write operations such as client I/O). The proprietary object format also has metadata information used to track compression group information, but the amount of metadata is around 32kb for a 4mb object. This metadata may be around 0.8% of the logical data, which is substantial when a large number of objects are stored in the object store. When the proprietary object format is used in a file system, the metadata for every object needs to be cached/stored in the performance tier. This is to avoid double object store reads. Instead of having to perform two reads to the object store (e.g., a read to access the metadata from the object and a read to access the actual data according to the metadata), the first read goes to cached slot metadata information at the performance tier in order to obtain a location of data in the object in the object store. This first read is a local read within the performance tier and is low cost or overhead. The second read is performed to read the actual data from the object store using the location of the object, and thus there is a single read operation targeting the object store. With metadata consumption around 0.8%, there is too much overhead consumption of expensive storage within the performance tier used to cache such metadata. For example, for a 1000TB amount of data tiered to the capacity tier of the object store, 8TB of the performance tier may be consumed for caching metadata. Thus, the proprietary object format cannot be used for primary workloads, and this new unified object format overcomes these issues by reducing metadata used to store data in the performance tier to 4kb (e.g., an 8× reduction) and improves the read performance on primary workloads. In some embodiments, the slot header information is cached as a 4kb space optimized metadata entry within the persistent metafile, which consumes 0.1% storage compared to metadata information used by the proprietary object format.

In some embodiments, a workflow for independent and layered compression to the object store is provided. This workflow supports the ability to tier already compressed data in a file system to the object store in objects formatted according to the unified object format and/or may also perform additional compression while sending the compressed data to the object store. This multi-layered compression helps to reduce the storage consumption of the object store and has little to no impact for reads from the file system. The additional compression may correspond to compression independent from the compression performed by the file system, such as compression upon uncompressed blocks of the file system. This enables the ability to compress smaller compression groups into to larger compression groups and/or transform a compression group from being compressed by one compression algorithm to being compressed by a different compression algorithm. The additional compression may occur independently and metadata about the compression groups is self-contained and tracked as part of the object that is being written to the object store. In particular, the slot header information within an object comprises information per slot and has compression group information about how data is grouped. This information is used to locate a compression group comprising a particular block of data. In this way, the slot header information can be used to translate from a slot number to an actual location in an object of a corresponding compression group containing a particular block.

In some embodiments, performance may be improved by caching metadata information such as slot header information of objects in the performance tier. Reading a block of data from a compression group stored within an object in the object store using the unified object format layout may result in two read operations, which is inefficient and results in large latency when reading data from the object store and increased cost. Two read operations are performed because the slot header information is read first from an object header of an object in order to identify and locate a corresponding compression group comprising the block to read from the object. A second read operation is then performed to read the actual compression group from the object in order to access the block. Instead of performing two read operations to the object store, which increases latency and cost, a technique is provided for reading a block of data from a compression group stored within an object in the object store using the unified object format layout by performing a single read operation as opposed to two read operations. This is enabled by caching slot header information into a persistent metafile at the performance tier for local and quick access. The persistent metafile is first consulted locally at the performance tier in order to identify an {offset, len} used to access a slot of data in an object targeted by a read operation. The offset and length is then used to perform a single read operation to the object store in order to read the data from the slot of the object. In this way, merely a single read operation to the object store (a cloud computing environment) is performed, and thus improving read performance and reducing client latency.

The unified object format layout comes in 3 sections. The first section comprises first level metadata (slot header information) that contains compression group information and the index that point to logical block of compression group—{cg_num, cg_index} for all 1024 slots in the object. The second section contains second level metadata compression group information an optimized form—{cg_num, cg_read_offset, cg_read_length} for all different compression groups in an object. cg_num is a compression group number, cg_read_offset is a read offset of the compression group, and cg_read_length is a length of the compression group to read. The third section comprises compressed data information. Without caching the slot header information, a read to a block includes a first cloud read to get metadata that resides in the object that gives {cg_read_offset, cg_read_length}, and a second read on the object to read the actual contents of the slot using this metadata, which is expensive and impacts the latency and also adds to more object store reads.

This technique involves replicating the (optimized) metadata information (slot header information) that is self-contained within an object header of the object to the local/performance tier in the form of a persistent metafile. Before data is tiered out from the performance tier to the object store by the hybrid storage system, the slot header information is constructed at the performance tier as part of the creation of objects to store the data and the tiering of the objects. This slot header information (e.g., 4kb slot header information) is cached as the persistent metafile at the performance tier for quick access. For each object tiered to the object store, this slot header information is populated within the persistent metafile and can be retrieved from the persistent metafile using an object identifier of an object (e.g., each entry within the persistent metafile may map an object identifier of an object to slot header information of the object). The persistent metafile is small, and thus there is little to no impact due to keeping the persistent metafile in the performance tier.

In some embodiments, a repair subsystem (a slot header repair subsystem) is provided to repair the persistent metafile in the performance tier in the event the persistent metafile becomes corrupt, has stale information, or is missing, which would result in incorrect data or no data being read from the object store. The repair subsystem provides the ability to repair the persistent metafile (a slot header metafile) that has been cached at the performance tier for quickly identifying offsets and lengths within objects for accessing particular blocks (a block to read from the object in the object store) stored within compression groups in the objects in the object store. Two different repair mechanisms are provided, and different triggers can be defined and used to trigger repair. Repair can be triggered on the fly in response to encountering an issue. For example, a read operation targeting a block of data in an object tiered to the object store may be received at the performance tier. The persistent metafile may be evaluated using an object identifier of the object to identify an entry for the object comprising information used to identify a corresponding compression group stored within the object and comprising the block (an offset and length to read). As part of evaluating the persistent metafile, a sequence number of the object may be compared with a sequence number of the entry to see if the sequence numbers match. If the sequence numbers do not match, then the entry may be determined to be invalid, and thus a repair of the entry may be triggered. As part of the repair, slot header information may be asynchronously retrieved from the object in the object store and used to repair the entry for the object identifier of the object with the slot header information retrieved from the object. In this way, subsequent read operations to the object will use the repaired entry.

The repair subsystem can also be triggered through a background scanner path. The persistent metafile is evaluated to determine the sizes of objects to read from the object store as part of resync path since objects do not have fixed sizes due to storing compressed data as part of the unified object format layout. A similar comparison of sequence numbers of the objects is performed in order to identify any entries (an entry for an object ID where the entry has a different sequence number than a sequence number of the object associated with the object ID) that need to be repaired. Repair can also be triggered during performance of other operations, such as a file system Iron operation (e.g., an operation to check file and directory metadata, scan inodes, and fix file system inconsistencies), garbage collection etc. Repair can also be triggered on demand using a separate tool tailored for proactive repair. That is, doing repair on the fly can be very expensive and lead to performance issues since the slot header information must be retrieved from an object head of an object in the object store in order to repair an entry that can then be used to process a pending read operation. Thus, this tool can be used to scan through all entries within the persistent metafile in order to identify and repair any invalid entries. This can be implemented by a user, implemented based upon a threshold number of repairs being performed on the fly, etc.

In some embodiments, a technique is provided to track what compression mechanism was used for an object ID of an object in a persistent manner. In particular, if data has been tiered out to the object store with the object ID as part of a normal write operation, then this is tracked. Thus, a resync operation will skip that object ID so that the data is only written out once for the same path (the normal write operation). Even if there is a restart of a write operation or a resync, the path used to write the data to the object store is tracked. This ensures that when data is written to the object store, there will be no instances where two objects have the same name but different data/sizes. This enables the ability to move data between different object stores (cloud providers) that support different object layouts, while still retaining compression and/or storage savings when possible.

As an example, different object store providers (cloud providers) may have different layout requirements, which affects the ability to utilize the same unified object format layout across different object store providers. Some object store providers may have layout requirements that allow for the unified object format layout to be used and shared across the object store providers so that compressed data can still be stored and identified within objects using the previously described techniques regardless of which object store of the object store providers is used to store the objects. But for some cloud providers, data is written out in a different format such as an uncompressed format with defined offsets/boundaries (4kb boundaries) because better storage savings can be achieved with this fixed format by using compression, deduplication, and/or other storage efficiency functionality provided by a backend of these object store providers. Thus, objects stored through these object store providers have a different format (uncompressed data stored at fixed boundaries) than the unified object format layout, which can be problematic where one of these object store providers is used as either a primary or secondary site and an object store provider that supports the unified object format is used as the other secondary or primary site.

Cloud mirroring may be performed from a first cloud provider supporting the unified object format layer (e.g., compressed data in variable sized objects) to a second cloud provider where the unified object format layer is not used (e.g., an object store where only uncompressed data is packaged into objects at defined offsets/boundaries according to a fixed format). In this scenario, the data from the first cloud provider can be retrieved, uncompressed, packaged into the fixed format, and stored into the second cloud provider. However, issues may occur when trying to mirror from the second cloud provider to the first cloud provider. Accordingly, in this reverse scenario, uncompressed data from the second cloud provider may be mirrored to the first cloud provider. When the uncompressed data is read from the second cloud provider, a compression algorithm may be implemented on the fly to compress the data. The compressed data is then stored in objects according to the unified object format layer at the first cloud provider. However, there may not be a way to remember what compression algorithm was used. There could be instances where there is a retry mechanism that retries storing an object to the first cloud provider. If a different compression algorithm is used by the retry mechanism, then there could be two objects with the same name but different data/sizes due to the different compression algorithms. This will violate the invariant that any data written to an object store provider using a same name is to be exactly the same when written out again. If there is no way to ensure that data, written out with the same name from one write to another write, is identical, then data corruption could occur. To address this issue, this technique tracks what compression mechanism was used for an object ID of an object in a persistent manner and what path was used to write the data to the object store. If data has been tiered out to the object store with an object ID as part of a normal write operation, then this normal write path is tracked. Thus, a resync operation will skip that object ID so that the data is only written out once for the same path (the normal write path). Even if there is a restart of a write operation or a resync, the path used to write the data to the object store is tracked. This ensures that when data is written to the object store, there will be no instances where two objects have the same name but different data/sizes. This enables the ability to move data between different object stores (cloud providers) that support different object layouts, while still retaining compression and/or storage savings when possible.

Various embodiments of the present technology provide for a wide range of technical effects, advantages, and/or improvements to computing systems and components. For example, various embodiments may include one or more of the following technical effects, advantages, and/or improvements: 1) the ability for both a cloud backup system and a hybrid storage system to interpret a unified object format so that both systems may manage and provide functionality for objects formatted according to the unified object format; 2) the ability to retain compression of data performed by a file system at a performance tier when the data is tiered to an object store in order to reduce storage consumption and cost of storing data in the object store; 3) the ability to provide additional compression for data being tiered to an object store in order to reduce storage consumption and cost of storing data in the object store; 4) caching slot header information within a persistent metafile that can be quickly and locally accessed at the performance tier so that a read for data within an object does not result in 2 read operations to the object store but merely a single read operation that uses information locally acquired from the persistent metafile, thus reducing read latency and improving client performance; 5) a repair subsystem that provides the ability to rebuild and/or the repair the persistent metafile for improved resiliency; and 6) the ability to migrate objects amongst object stores that may support different object format layout requirements, thus allowing clients to migrate data between different object store providers.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on- premise, cloud-based, or hybrid storage solution. In some embodiments, the storage provided by the clusters of nodes 134, 138 and storage provided by the data storage tier 108 of a distributed computing platform 102 (e.g., a $3^{rd}$ party cloud storage provider that hosts an object storage 124 and/or other types of storage) may be implemented as a hybrid cloud environment used by a cloud backup system 150 and hybrid storage system 158 for store data on behalf of clients, such as the client device 128.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some embodiments, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the present technology, the distributed computing platform 102 may be a multi-tenant and service platform operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
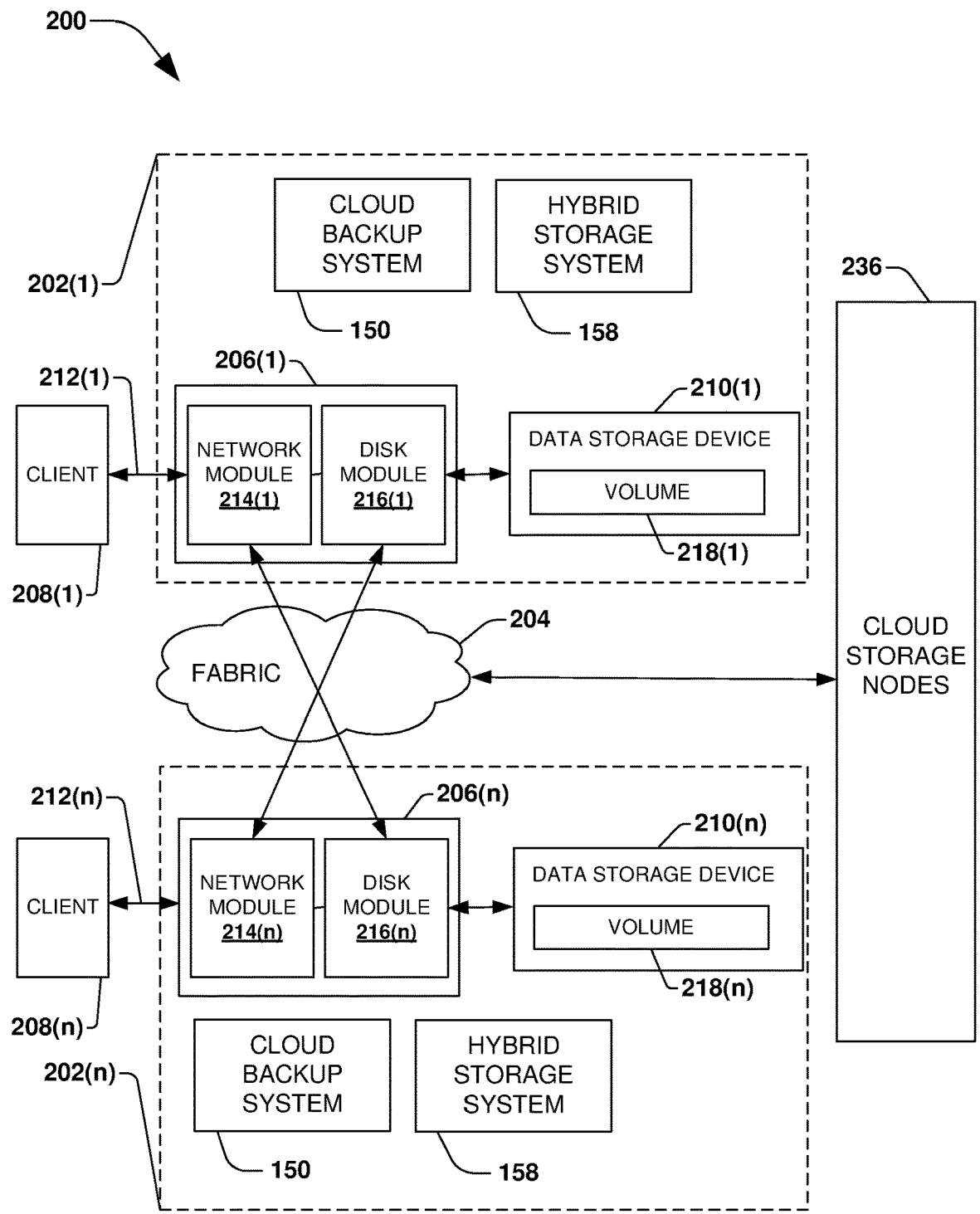
FIG. 2 is a block diagram illustrating an example of a network environment with exemplary nodes in accordance with an embodiment of the present technology.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

In some embodiments, the data storage devices 210(1)-210(n) and the cloud storage device(s) 236 (e.g., storage of a $3^{rd}$ party cloud storage provider used to host an object storage 124) may be implemented as a hybrid cloud environment used by a cloud backup system 150 and hybrid storage system 158 for store data on behalf of clients, such as client devices 212(1)-212(n).

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n)can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
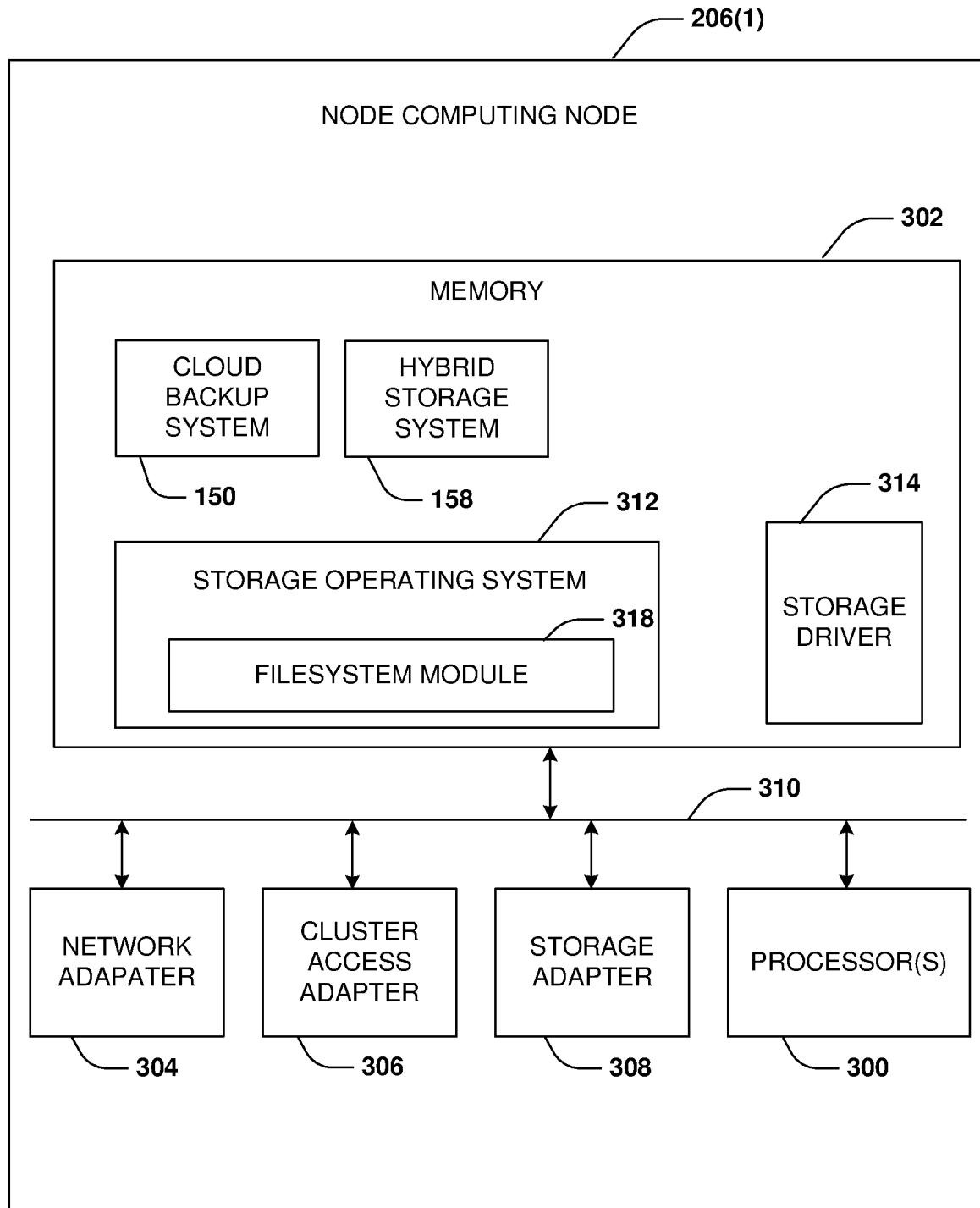
FIG. 3 is a block diagram illustrating an example of various components that may be present within a node that may be used in accordance with an embodiment of the present technology.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In some embodiments, programming code of the cloud backup system 150 and/or the hybrid storage system 158 may be stored within memory 302 and executed by the processors 300.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

In some embodiments of implementing a unified object format, the unified object format overcomes the following disadvantage of the proprietary object formats used by the hybrid storage system and/or the cloud backup system. A proprietary object format used by a file system at a performance tier to tier blocks (e.g., a propriety object format of the hybrid storage system) has the following limitations: 1) the data that is compressed in the file system may not be preserved and requires decompression while sending the data to the object store as objects; and 2) there is no ability to improve storage consumption savings by otherwise being able to do additional compression on the data during tier and/or recompressing already compressed blocks with a different heavier compression algorithm. These limitations of the proprietary object format used by the file system reduces the scope on the amount of capacity tier storage consumption savings in the object store. These issues occur because the block information of the data in the performance tier is stored at the fixed offsets. When the data is compressed, there is no fixed offset for the data, which would be needed for compression with other blocks. Accordingly, the compressed blocks of the file system must be uncompressed, thus losing the storage savings when being sent to capacity tier. As an example, v1, v2, v3, v4 are blocks that are not compressed by file system (e.g., virtual volume block number 1 (v1), virtual volume block number 2 (v2), etc.). These blocks are written in an uncompressed form to physical blocks P1, P2, P3 and P4 respectively (e.g., physical volume block number 1 (P1), physical volume block number 2 (P2), etc.). In an example, v5 and v6 are compressed to a P5 block, and v7 and v8 are compressed to a P7 block. v9, v10, v11, v12, v13, v14, v15, and v16 are compressed to 2 blocks P9 and P10. As the proprietary object format does not represent the compressed data, the data is sent to the object store in an uncompressed form.

Figure 4:
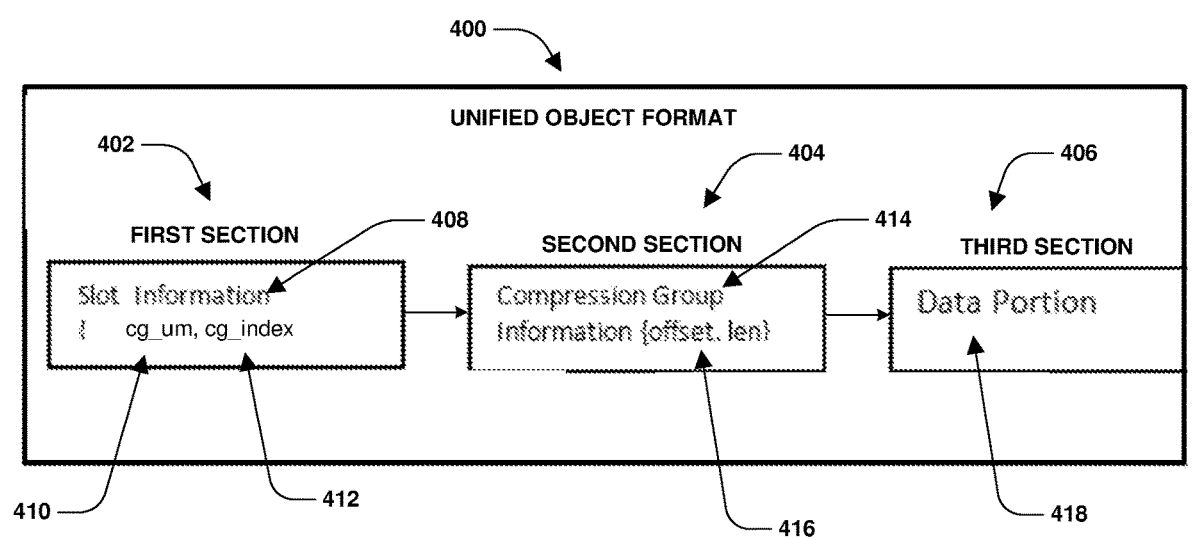
FIG. 4 is an example of a unified object format in accordance with an embodiment of the present technology.

In order to overcome these limitations, this unified object format 400 is introduced, an example of which is illustrated by FIG. 4. The unified object format 400 may be divided into 3 sections, such as a first section 402, a second section 404, and a third section. The first section 402 comprises a first level metadata section information. The first metadata section information of the first section 402 (first metadata part) comprises slot information 408 that gives information about a block, such as to which compression group 'number' 410 a slot comprising the block belongs and a logical index 412 in that compression group 'number' of the block. The first level metadata section information of the first section 402 (first metadata part) may be of the format of <cg_num, cg_index>. The second section comprises a second metadata part. The second section 404 (second metadata part) may comprise all the compression group's information 414 and maintains a mapping or location (location information 416) to the data portion 418 of the object in optimized form (e.g., an offset and a length of the data portion 418). The second section 404 (second metadata part) may be in a format of <offset, len>. The third section 406 is a data section that contains the actual data portion 418, such as the actual compressed data.

The first level metadata section information of the first section 402 (first metadata part) may be part of the on-disk format layout that tracks a list of all the object blocks that belongs to the object. The first level metadata section information of the first section 402 (first metadata part) contains the mapping of the object block number to the compression group to which the object block number belongs and a logical block number in that compression group. For example, first level metadata section information of the first section 402 (first metadata part) may comprise <cg_num=1, cg_index=1>, <cg_num=1, cg_index=2>, <cg_num=2, cg_index=1>, . . . . The second section 404 (second metadata part) may contain information 414 about the compression group, which has location information 416 such <offset, len>for the data section that needs to be read. For example, the second section 404 (second metadata part) may comprise <offset=10K, len=2K>, <offset=12, len=2K>, . . . . The independent compression group metadata information within the object layout helps to perform independent compression and is transparent to the file system of the performance tier. In this way, FIG. 4 illustrates an example of the unified object format 400 comprising the first section 402 (first metadata part), the second section 404 (second metadata part), and the third section 406 (data section).

Figure 5:
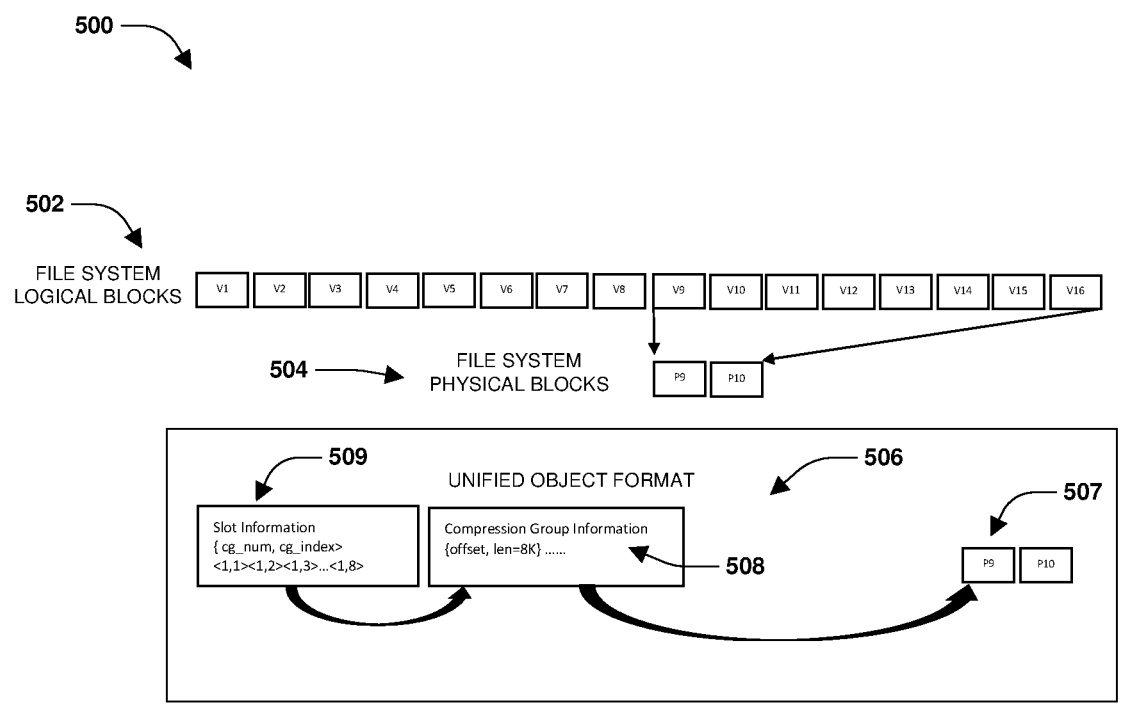
FIG. 5 is an example of a unified object format in accordance with an embodiment of the present technology.

Referring to example 500 of FIG. 5, the unified object format 506 has the ability to retain the compressed data of the file system. The file system may maintain file system logical blocks 502, such as V1-V16. Data of the file system logical blocks may be physically stored as file system physical blocks 504 on storage, such as P9 and P10. The unified object format 506 is used to copy of the compressed data of the file system to the object store according to an object layout (without any decompression and recompression) and update the metadata sections of the object layout. The file system logical blocks V9 to V16 may be compressed into file system physical blocks P9 and P10. In the unified object format 506, the data from file system physical blocks P9 and P10 may be copied into an object's data section 507. A second section 508 (second metadata part) of "compression group" information is updated with <offset, len=8K>. Each object slot information 509 is updated with corresponding compression group number (cg_num) and logical index in the compression group number. Assuming cg_num is 1 and represents 32KB's compressed data which is 8KB, and all the file system logical blocks V9 to V16 are in that order for compression. In this example, the object slot information 509 will be <1,1>,<1,2><1,3>,<1,4>,<1,5>,<1,6><1,7>,<1,8>.

Figure 6:
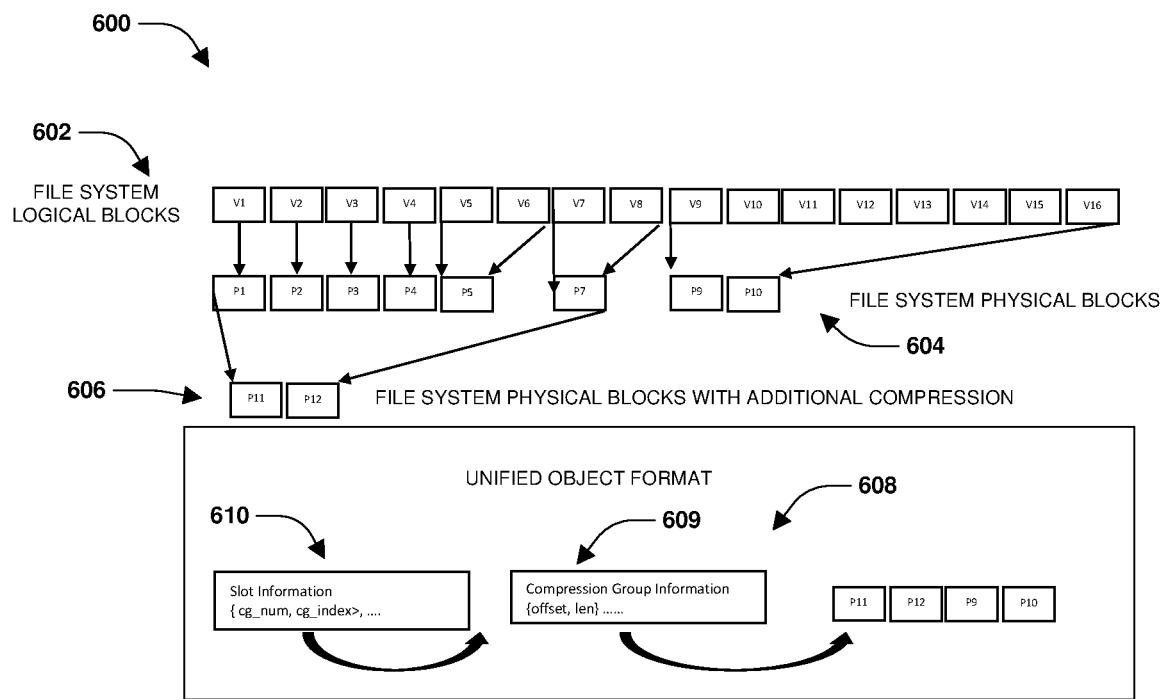
FIG. 6 is an example of a unified object format in accordance with an embodiment of the present technology.

Referring to example 600 of FIG. 6, unified object format 608 has ability to perform additional compression of the file system data, such as upon the file system logical blocks 602 and/or the file system physical blocks 604. The additional compression comes in 2 forms: 1) performing compression on blocks that are not tiered or were not compressed and 2) performing recompression of small compression groups to create bigger compression groups, which can be done with a different heavier compression algorithm. The different types of blocks of the file system are: file system logical blocks V1 to V4 that are uncompressed blocks; file system logical blocks V5 and V6 that are compressed to file system physical blocks P5, and file system logical blocks V7 and V8 that are compressed to file system physical block P7. In this way, file system logical blocks 602 are stored within file system physical blocks 604. In the unified object format 608, the data of file system physical blocks P5 and P7 is decompressed and recompressed with the data of the uncompressed blocks of file system logical blocks V1 to V4 to create file system physical blocks 606 P11 and P12 that have additional compression. A second section 609 (second metadata part) of "compression group" information is updated with <offset, len>. Each object slot information 610 is updated with corresponding compression group number (cg_num) and logical index in the compression group number. Assuming cg_num is 2 and all file system logical blocks V1 to V8 are in that order for compression, then the object slot information 610 will be <2,1>,<2,2><2,3>,<2,4>,<2,5>,<2,6><2,7>,<2,8>.

Figure 7:
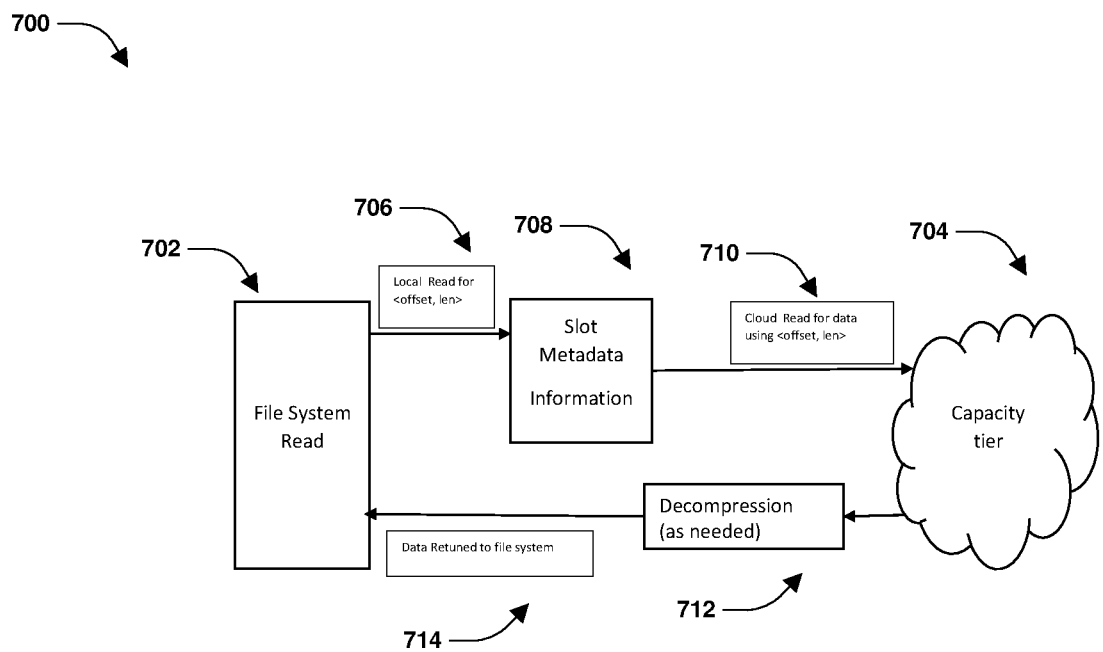
FIG. 7 is a block diagram illustrating an example of implementing a unified object format in accordance with an embodiment of the present technology.

The unified object format supports the ability to retain the compressed data of the file system (and also perform additional compression) by providing the additional metadata section in the layout along with the data section. However, this forces the file system to perform two read operations to the object store (cloud) in order to process a single read operation for data stored within an object in the object store. In the first cloud read operation, the metadata section (slot header information) is checked to identify a location of the data within the object. In the second cloud read operation, the actual data is read based on the location information obtained by the first cloud read operation. The double cloud read operations result in performance issues and impacts the latency of the read operation. To address this and improve performance, the metadata information may be stored locally in the performance tier. So during a read operation, the file system first consults the slot object metadata information stored locally at the performance tier to find the object location information. Once the object location information is obtained, a single cloud read is performed to get the actual data. During the single cloud read to get the actual data, the data may be decompressed if the data is part of a compression group. FIG. 7 illustrates a read workflow 700 for a file system read 702 to a capacity tier 704 of the object store. A local read 706 for an offset and length is performed to slot metadata information 708 that may be cached within the performance tier. Next, a cloud read 710 is performed using the offset and length to the capacity tier 704 to read data within an object in the capacity tier 704. If the data is to be decompressed, then decompression 712 is performed and the data is returned 714 for the file system read 702.

Figure 8:
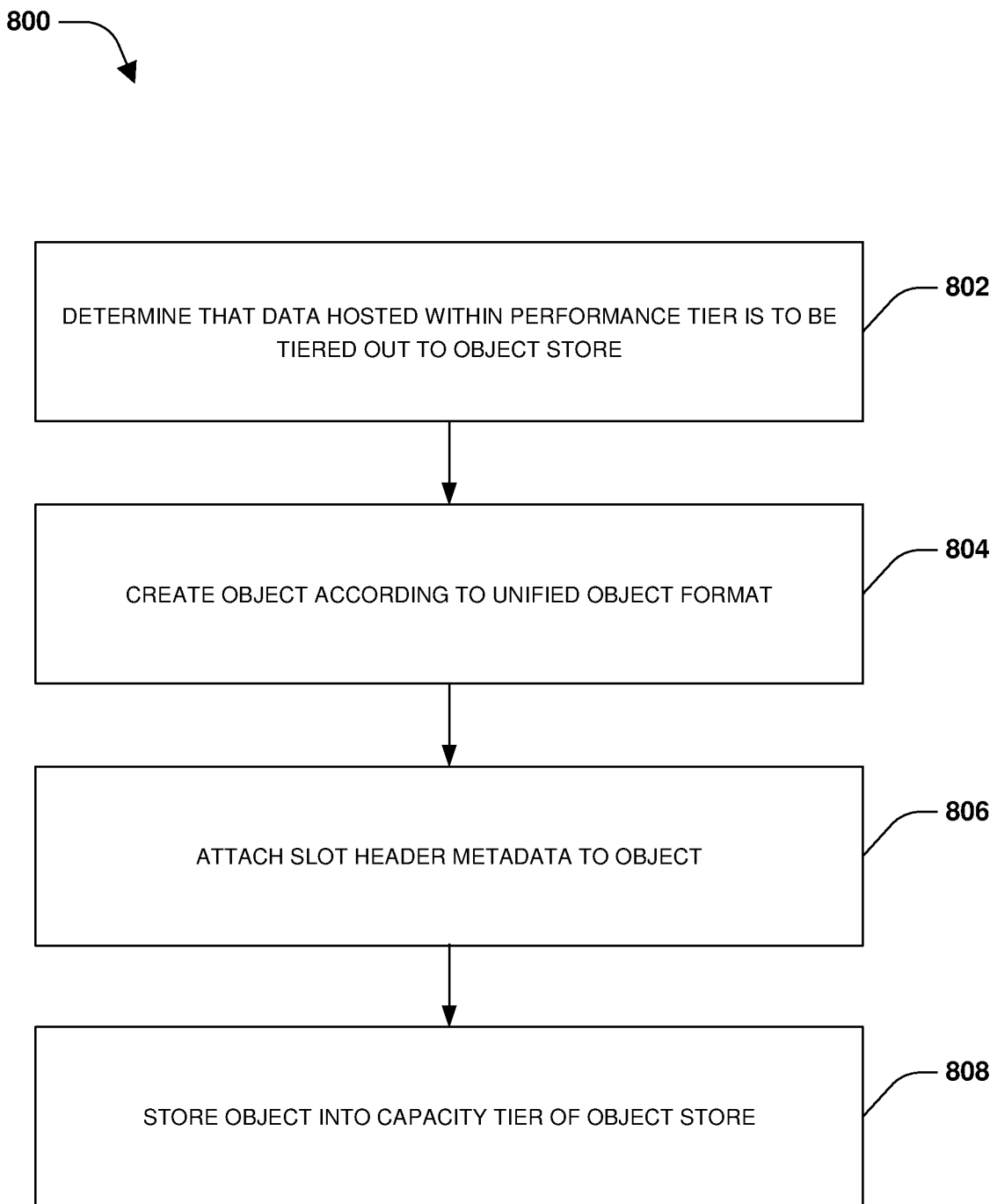
FIG. 8 is a flow chart illustrating an example of implementing a unified object format in accordance with an embodiment of the present technology.
Figure 9A:
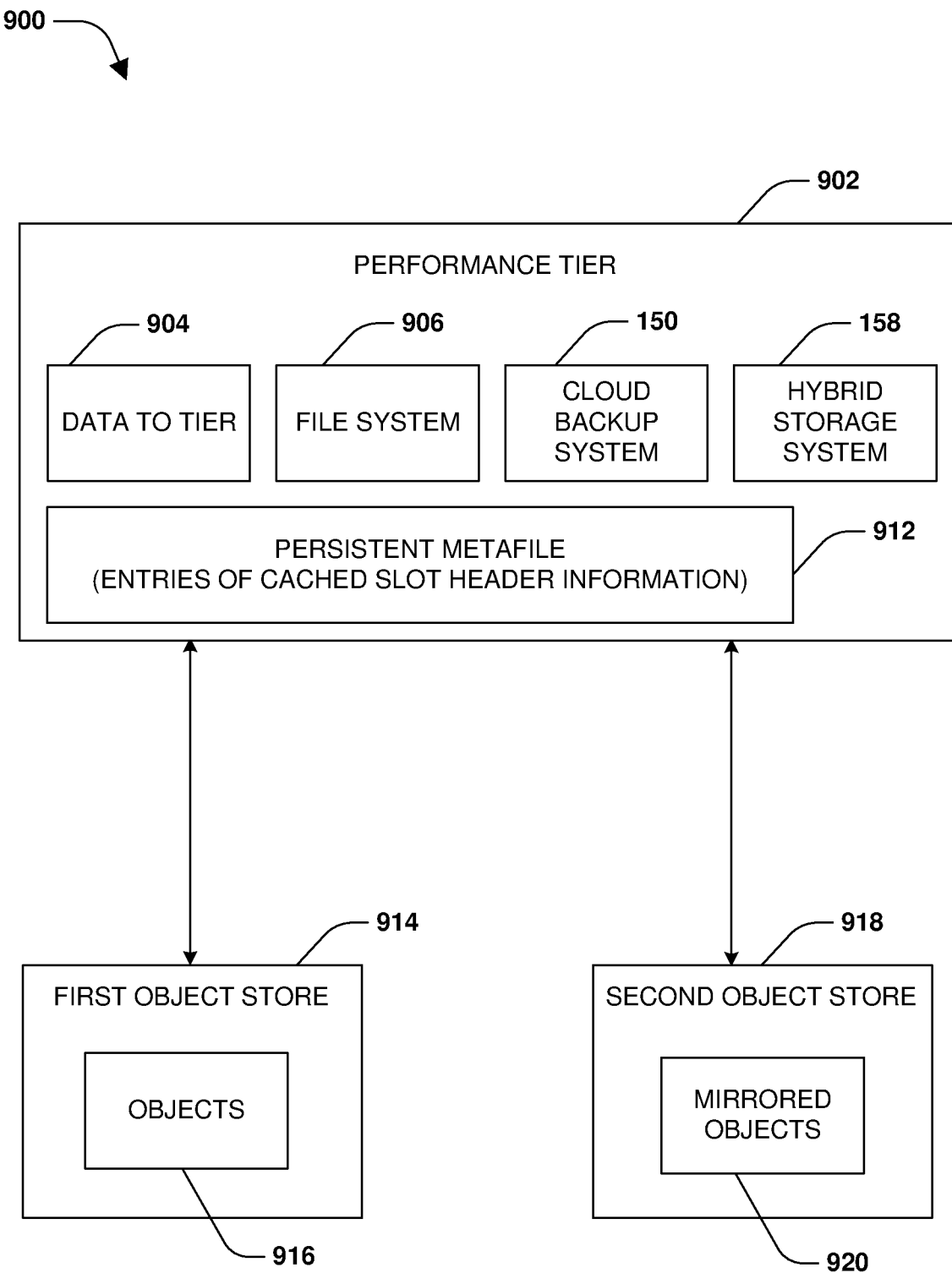
FIG. 9A is a component block diagram illustrating an example system for implementing a unified object format in accordance with an embodiment of the present technology.

One embodiment of implementing a unified object format is illustrated by an exemplary method 800 of FIG. 8, which is further described in conjunction with system 900 of FIG. 9A. A performance tier 902 (e.g., on-premise storage such as hard disk drives, solid state drives, or any other type of storage) may host a file system 906 used to store data accessible to clients and/or applications, such as through a volume. A cloud backup system 150 may create snapshots of the volume. The cloud backup system 150 may be configured to create objects formatted according to the unified object format. The cloud backup system 150 may store snapshot data (backup data) of the snapshots into the objects. The cloud backup system 150 may store the objects into a first object store 914 as objects 916. A hybrid storage system 158 may be configured to tier data between the performance tier 902, the first object store 914, a second object store 918, and/or other storage locations. For example, frequently accessed data may be stored within the performance tier 902 such as for access through the file system 906 because the performance tier 902 is comprised of relatively faster and/or lower latency compared to the object stores. Infrequently accessed data may be stored within an object store for low cost, scalable, longer term storage, such as by storing the data into objects formatted according to the unified object format and stored within the first object store 914 as the objects 916. In this way, the hybrid storage system 158 may be configured to interpret the unified object format and to tier data between the object stores and the performance tier 902.

During operation 802 of FIG. 8, data 904 with the performance tier 902 may be identified for being tiered out to a capacity tier of the first object store 914. During operation 804 of FIG. 8, an object may be created according to the unified object format. The data 904 may be stored within slots of the object (e.g., the object may comprise 1024 slots that may store 4kb of data each). During operation 806 of FIG. 8, slot header metadata may be attached to the object. The slot header metadata may comprise a data section comprising the data 904. The slot header metadata may comprise a first metadata portion. The first metadata portion may comprise a compression group number of a slot of the object within which a block of the data 904 is to be stored. The first metadata portion may comprise a compression group logical index in the compression group number at which the slot is located. The slot header metadata may comprise a second metadata portion. The second metadata portion may comprise offset and length location information for the data 904 within the data section. During operation 808 of FIG. 8, the object may be stored into the capacity tier of the first object store 914.

In some embodiments, the first metadata portion and the second metadata portion is populated with compression group information used to preserve compression performed upon the data 904 by the performance tier 902. In this way, the data 904 stored within the object retains the compression. In some embodiments, additional compression is performed upon the data 904 to create additionally compressed data stored within the object. The first metadata portion and the second metadata portion may be populated with compression group information used to preserve the additional compression. In this way, the additionally compressed data stored within the object retains the compression. In some embodiments where the data 904 was compressed by the file system 906 using a first compression algorithm, the data 904 may be recompressed using a second compression algorithm different than the first compression algorithm to create additionally compressed data stored within the object. The first metadata portion and the second metadata portion may be populated with compression group information used to preserve the recompression performed by the second compression algorithm. In this way, the additionally compressed data stored within the object retains the compression. In some embodiments where the data 904 was compressed by the file system 906 as a first compression group, the data 904 may be recompressed into a second compression group larger than the first compression group. The first metadata portion and the second metadata portion may be populated with compression group information used to preserve the second compression group. In this way, the second compression group stored within the object retains the compression.

In some embodiments, a request to read data from the object within the first object store 914 is received. The offset and length location information in the slot header metadata may be read to identify an offset and a length of the data within the object. An object store read operation maybe performed using the offset and length to read the data from the object within the first object store 914. The data may be provided in response to the request. In some embodiments, the data may be decompressed and provided in response to the request.

In some embodiments, the slot header metadata of the object may be cached within a persistent metafile 912 stored within the performance tier 902. Slot header metadata may be stored within entries for each object stored within the first object store, such as a first entry for a first object, a second entry for a second object, etc. Each entry may comprise 4kb or any other amount of information. An entry for an object may comprise a sequence number of the object, an object identifier of the object, and/or other information. When a request to read data from the object is received, the offset and length location information in the slot header metadata cached within the persistent metafile 912 may be locally read from the persistent metafile 912 within the performance tier 902 without having to read such information from the first object store 914. After the local read operation to the persistent metafile 912 is performed, an object store read operation is performed using the offset and length to read the data from the object within the first object store 914.

Figure 9B:
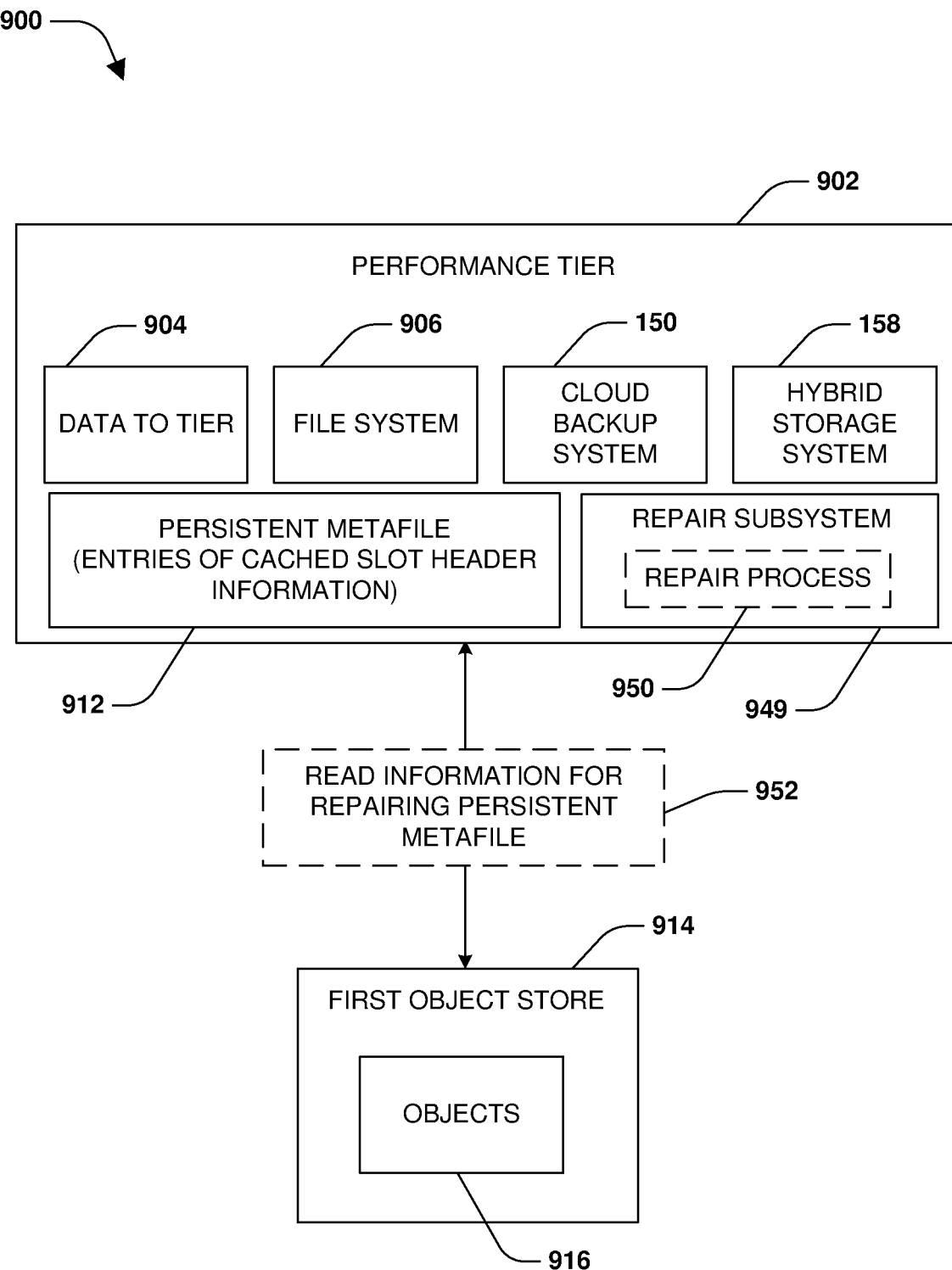
FIG. 9B is a component block diagram illustrating an example system for implementing a repair process in accordance with an embodiment of the present technology.

In some embodiments, persistent metafile 912 may be determined to be corrupt, comprising stale information, or missing. Accordingly, a repair process 950 may be executed by a repair subsystem 949 (a slot header repair subsystem) to repair the persistent metafile 912 by reading 952 the slot header metadata from the object in the first object store 914 and repairing the persistent metafile 912 using the slot header metadata, as illustrated by FIG. 9B. In an example, repair of the persistent metafile 912 may be triggered based upon a determination that a sequence number read from the object in the first object store 914 does not match a sequence number within an entry in the persistent metafile 912 for the object. The entry is assigned an object identifier of the object and comprises the slot header metadata of the object.

In some embodiments of triggering the repair process 950, a resync operation may be performed to evaluate the persistent metafile 912 for identifying sizes of objects to read from the first object store 914 for resync. During the resync operation, sequence numbers of the objects read from the first object store 914 are compared to sequence numbers of entries within the persistent metafile 912 for the objects. A repair of the persistent metafile 912 may be performed for entries with sequence numbers not matching sequence numbers of corresponding objects.

In some embodiments of triggering the repair process 950, a scanner is implemented to evaluate entries within the persistent metafile 912 for objects to determine whether sequence numbers within the entries match sequence numbers assigned to the objects in the first object store 914. A repair of the persistent metafile 912 is triggered for entries with sequence numbers not matching sequence numbers of corresponding objects.

In some embodiments, mirroring of objects between object stores may be performed such to transition a client from using and store objects within the first object store 914 to using and storing objects (e.g., mirrored objects 920) within the second object store 918 (or other object stores), as illustrated by FIG. 9A. In some embodiments, an object may be retrieved from the first object store 914, such as being retrieved into the performance tier 902. The object is written to the second object store 918 in a network and space optimized manner such that decompression and recompression of the object is avoided.

Figure 10:
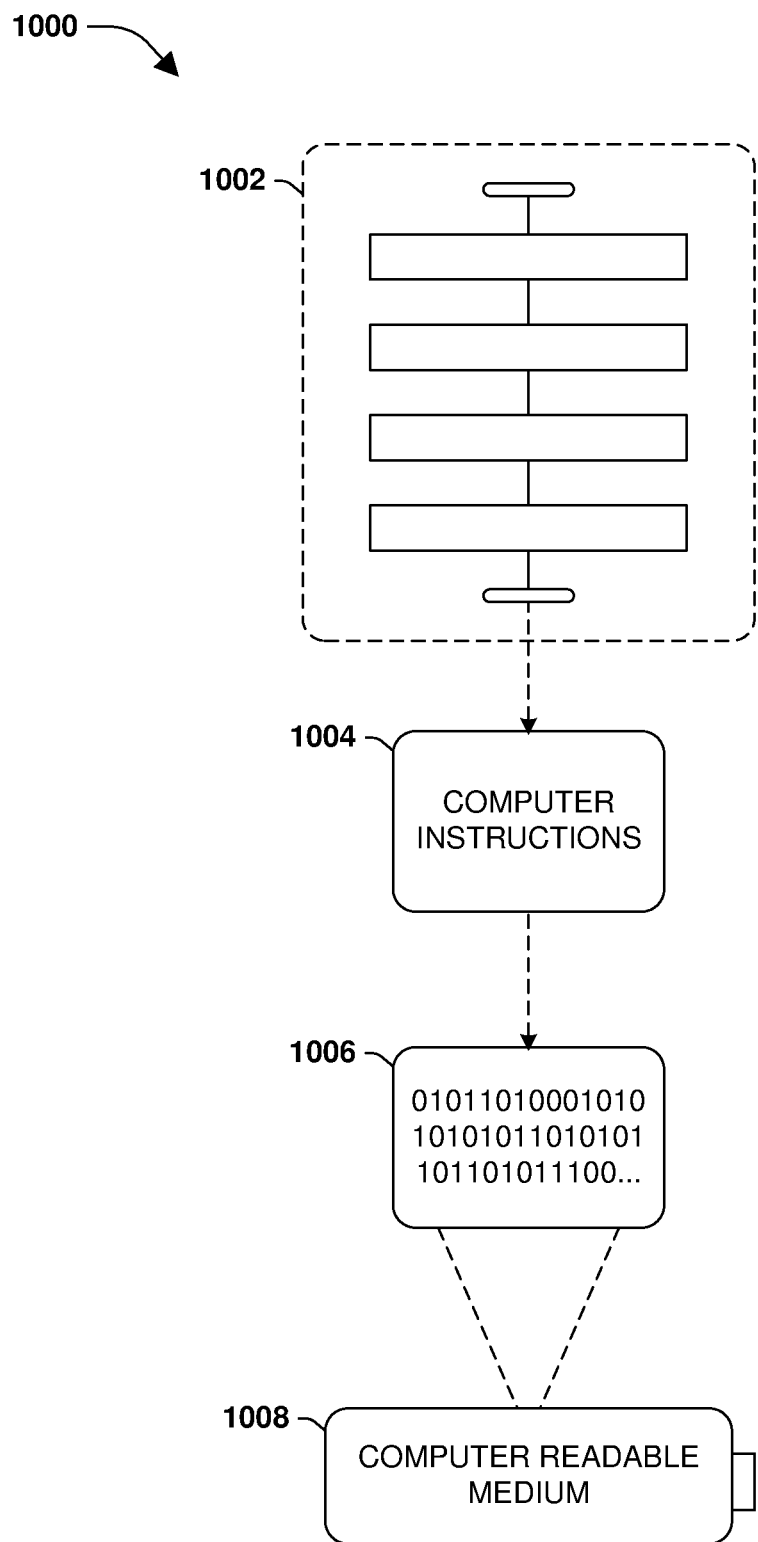
FIG. 10 is an example of a computer readable medium in which an embodiment of the present technology may be implemented.

Still another embodiment involves a computer-readable medium 1000 comprising processor-executable instructions configured to implement one or more of the techniques presented herein. An example embodiment of a computer-readable medium or a computer-readable device that is devised in these ways is illustrated in FIG. 10, wherein the implementation comprises a computer-readable medium 1008, such as a compact disc-recordable (CD-R), a digital versatile disc-recordable (DVD-R), flash drive, a platter of a hard disk drive, etc., on which is encoded computer-readable data 1006. This computer-readable data 1006, such as binary data comprising at least one of a zero or a one, in turn comprises processor-executable computer instructions 1004 configured to operate according to one or more of the principles set forth herein. In some embodiments, the processor-executable computer instructions 1004 are configured to perform a method 1002, such as at least some of the exemplary method 800 of FIG. 8, for example. In some embodiments, the processor- executable computer instructions 1004 are configured to implement a system for implementing a unified object format such as at least some of the exemplary system 900 of FIG. 9, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A method comprising:
   creating an object according to a unified object format for tiering data from a performance tier to a capacity tier of an object store, wherein the data is stored within slots of the object and slot header metadata is attached to the object and comprises:
      a first metadata portion comprising a compression group number of a slot within which a block of the data is stored and a compression group logical index in the compression group number at which the slot is located; and
      a second metadata portion comprising offset and length location information for the data within a data section comprising the data;
   performing additional compression upon the object to recompress smaller compression groups to create a larger compression group by:
      decompressing file system physical blocks storing compressed file system logical blocks of the data in the object to create decompressed data; and
      recompressing the decompressed data with uncompressed file system logical blocks to create new file system physical blocks that have additional compression and are stored within the object; and
   storing the object into the capacity tier of the object store.

2. The method of claim 1, wherein the performing additional compression comprises:

modifying the second metadata portion with updated offset and length location information associated with the new file system physical blocks stored within the object.

3. The method of claim 1, comprising:
executing a cloud backup system, configured to interpret the unified object format, to back up snapshots of a volume hosted at the performance tier as objects formatted according to the unified object format and stored within the object store.

4. The method of claim 1, comprising:
populating the first metadata portion and the second metadata portion with compression group information used to preserve compression performed upon the data by the performance tier, wherein the data stored within the object retains the compression.

5. The method of claim 1, wherein the performing additional compression comprises:
modifying the first metadata portion with updated compression group number and logical index information associated with the new file system physical blocks stored within the object.

6. The method of claim 1, wherein the data is compressed by a file system according to a first compression algorithm, and wherein the method comprises:
recompressing the data using a second compression algorithm different than the first compression algorithm to create additionally compressed data stored within the object; and
populating the first metadata portion and the second metadata portion with compression group information used to preserve the recompression performed by the second compression algorithm, wherein the additionally compressed data stored within the object retains the compression.

7. The method of claim 1, wherein the data is compressed by a file system as a first compression group, and wherein the method comprises:
recompressing the data into a second compression group larger than the first compression group; and
populating the first metadata portion and the second metadata portion with compression group information used to preserve the second compression group, wherein the second compression group stored within the object retains the compression.

8. The method of claim 1, comprising:
reading the object in a compressed form from the object store as part of a mirroring object operation; and
writing the data to a different object store directly in the compressed form.

9. The method of claim 1, comprising:
performing a mirror object operation to read and write the object in a compressed form for reduced network transfer and storage space utilization.

10. A computing device comprising:
a memory comprising machine executable code; and
a processor coupled to the memory, the processor configured to execute the machine executable code to cause the processor to:
create an object according to a unified object format for tiering data from a performance tier to a capacity tier of an object store, wherein the data is stored within slots of the object and slot header metadata is attached to the object and comprises:
a first metadata portion comprising a compression group number of a slot within which a block of the data is stored and a compression group logical index in the compression group number at which the slot is located; and
a second metadata portion comprising offset and length location information for the data within a data section comprising the data;
perform additional compression upon the object to recompress smaller compression groups to create a larger compression group by:
decompressing file system physical blocks storing compressed file system logical blocks of the data in the object to create decompressed data; and
recompressing the decompressed data with uncompressed file system logical blocks to create new file system physical blocks that have additional compression and are stored within the object; and
store the object into the capacity tier of the object store.

11. The computing device of claim 10, wherein the machine executable code causes the processor to:
execute a hybrid storage system, configured to interpret the unified object format, to tier data between the object store and the performance tier as objects formatted according to the unified object format.

12. The computing device of claim 10, wherein the machine executable code causes the processor to:
execute a cloud backup system, configured to interpret the unified object format, to back up snapshots of a volume hosted at the performance tier as objects formatted according to the unified object format and stored within the object store.

13. The computing device of claim 10, wherein the machine executable code causes the processor to:
populate the first metadata portion and the second metadata portion with compression group information used to preserve compression performed upon the data by the performance tier, wherein the data stored within the object retains the compression.

14. The computing device of claim 10, wherein the data is compressed by a file system, and wherein the machine executable code causes the processor to:
modify the second metadata portion with updated offset and length location information associated with the new file system physical blocks stored within the object; and
modify the first metadata portion with updated compression group number and logical index information associated with the new file system physical blocks stored within the object.

15. The computing device of claim 10, wherein the data is compressed by a file system according to a first compression algorithm, and wherein the machine executable code causes the processor to:
recompress the data using a second compression algorithm different than the first compression algorithm to create additionally compressed data stored within the object; and
populate the first metadata portion and the second metadata portion with compression group information used to preserve the recompression performed by the second compression algorithm, wherein the additionally compressed data stored within the object retains the compression.

16. The computing device of claim 10, wherein the data is compressed by a file system as a first compression group, and wherein the machine executable code causes the processor to:

recompress the data into a second compression group larger than the first compression group; and populate the first metadata portion and the second metadata portion with compression group information used to preserve the second compression group, wherein the second compression group stored within the object retains the compression.

17. The computing device of claim 10, wherein the machine executable code causes the processor to:

read the object in a compressed form from the object store as part of a mirroring object operation; and write the data to a different object store directly in the compressed form.

18. The computing device of claim 10, wherein the machine executable code causes the processor to:

perform a mirror object operation to read and write the object in a compressed form for reduced network transfer and storage space utilization.

19. A non-transitory machine readable medium comprising instructions for performing a method, which when executed by a machine, causes the machine to:

create an object according to a unified object format for tiering data from a performance tier to a capacity tier of an object store, wherein the data is stored within slots of the object and slot header metadata is attached to the object and comprises:

a first metadata portion comprising a compression group number of a slot within which a block of the data is stored and a compression group logical index in the compression group number at which the slot is located; and a second metadata portion comprising offset and length location information for the data within a data section comprising the data;

perform additional compression upon the object to recompress smaller compression groups to create a larger compression group by:

decompressing file system physical blocks storing compressed file system logical blocks of the data in the object to create decompressed data; and recompressing the decompressed data with uncompressed file system logical blocks to create new file system physical blocks that have additional compression and are stored within the object; and store the object into the capacity tier of the object store.

20. The non-transitory machine readable medium of claim 19, wherein the instructions cause the machine to:

cache the slot header metadata within a persistent metafile stored within the performance tier; and in response to determining that the persistent metafile is corrupt or missing, execute a repair process to repair the persistent metafile.

* * * * *